(No Model.)

S. F. SAVITS.
PLOW ATTACHMENT.

No. 472,179. Patented Apr. 5, 1892.

Witnesses
F. R. Cornwall
L. S. Bacon.

Inventor
Samuel F. Savits
By Jos. H. Hunter
Attorney

UNITED STATES PATENT OFFICE.

SAMUEL F. SAVITS, OF PLIMPTON, OHIO.

PLOW ATTACHMENT.

SPECIFICATION forming part of Letters Patent No. 472,179, dated April 5, 1892.

Application filed September 16, 1891. Serial No. 405,903. (No model.)

*To all whom it may concern:*

Be it known that I, SAMUEL F. SAVITS, a citizen of the United States, residing at Plimpton, in the county of Holmes and State of Ohio, have invented certain new and useful Improvements in Plow Attachments, of which the following is a specification, reference being had therein to the accompanying drawings.

My invention relates to an improvement in plow attachments; and it consists in the construction and arrangement of parts hereinafter described, and definitely pointed out in the claims.

The object of my invention is to provide an improved device for separating and clearing the plow from grass, weeds, &c. This object I attain by the construction illustrated in the accompanying drawings, wherein like letters of reference indicate like parts in the several views, and in which—

Figure 1:
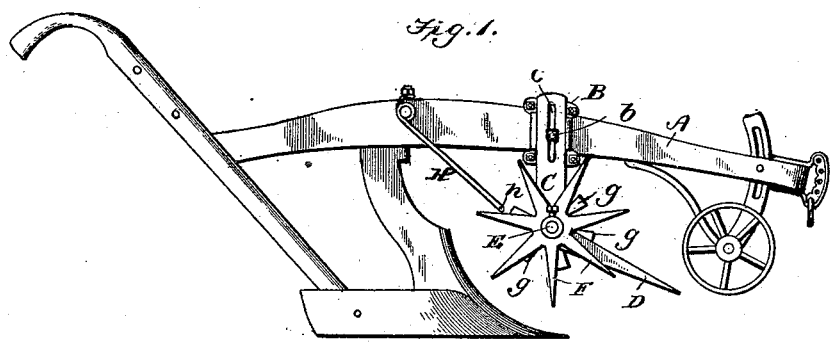
Figure 2:
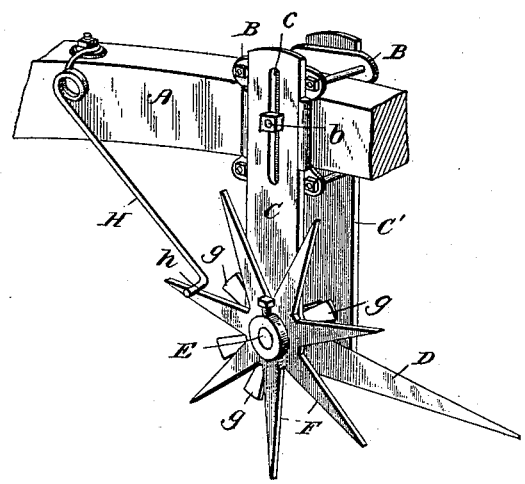
Figure 3:
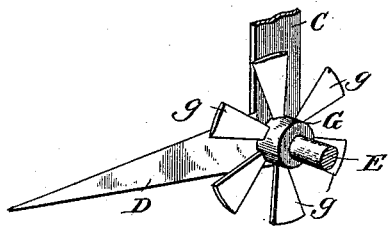

Figure 1 is a side elevation of a plow with my attachment. Fig. 2 is a perspective view of my attachment, and Fig. 3 is a detail perspective of the share or cutter.

In the drawings, A represents the beam of a plow, having plates B bolted thereon on opposite sides at a point midway the length of the beam. These plates carry bolts $b$, which pass through elongated slots $c$ or vertical bearing-plates C and C'. The bolts are capped by suitable nuts, so that the bearing-plates may be adjusted vertically and held in their adjusted position.

On the lower end of the plate C is formed a gathering-foot D, which extends outwardly toward the front of the plow at an incline, its upper inner edge forming the stationary cutting-edge of the share.

A bearing is formed in the lower ends of the plates C and C', through which a horizontal shaft E is placed. This shaft has keyed on its outer end a star-wheel F, with a series of radial arms extending down below the end of the foot. Between the plates on the shaft E is keyed a rotary cutter or share G, consisting of a hub having a series of radial blades $g$, with sharp or cutting edges. These blades are placed in close proximity to the foot, so that the foot will form the stationary abutment to hold the material while the knives sever the same.

H is a yielding scraper to clean the wheel F from any accumulated matter. This cleaner is made yielding and has a right-angle offset $h$ on its end, which rides on the edge of the arms of the wheels and is carried up over the end of the arm as the wheel revolves, thus taking off all dirt or other matter that may stick to the arms.

In operation the device is securely attached to the plow and adjusted to its proper position. As the plow is moved through the soil the wheel F is rotated, carrying the knives with it, the inclined foot lifting the straw or other material up its inclined edge to the share or knives, where the same is severed, a portion dropping into the furrow, and thereby preventing the accumulation of débris on the mold-board or standard.

I am aware that many minor changes in the construction and arrangement of the parts of my device can be made and substituted for those herein shown and described without in the least departing from the nature and principle of my invention.

Having thus described my invention, what I claim as new, and desire to secure by Letters Patent, is—

1. In a plow attachment, the combination, with the beam, of attaching means; a shaft journaled in the same, a rotary cutter on one end of the shaft, a gathering-foot forming a stationary abutment for the cutter, and a ground-wheel secured on the other end of said shaft for rotating the cutter, substantially as described.

2. In a plow attachment, the combination, with the beam, of two downwardly-extending supporting-plates on the same, an inclined gathering-foot on one of the supporting-plates, a shaft journaled in the supporting-plates, a rotary cutter on the shaft between the plates and adjacent to the inclined foot, and a ground-wheel on the outer end of said shaft for rotating the cutter, substantially as described.

3. In a plow, the combination, with the beam, plates secured thereon, supporting-plates adjustably secured to said plates, a shaft journaled in the supporting-plates, a rotary knife on the shaft, a ground-wheel on the shaft, rotating the knife, an inclined foot forming the stationary abutment for the knives, and a yielding cleaner on the beam, engaging the wheel, substantially as described.

In testimony whereof I affix my signature in presence of two witnesses.

SAMUEL F. SAVITS.

Witnesses:
M. W. WEBB,
DANIEL CROW.